(12) United States Patent
Toshioka et al.

(10) Patent No.: US 8,132,403 B2
(45) Date of Patent: Mar. 13, 2012

(54) METHOD OF ESTIMATING QUANTITY OF $N_2O$ PRODUCED IN AMMONIA OXIDATION CATALYST AND EXHAUST GAS PURIFICATION SYSTEM FOR INTERNAL COMBUSTION ENGINE

(75) Inventors: Shunsuke Toshioka, Susono (JP); Tomihisa Oda, Numazu (JP); Kazuhiro Itoh, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 390 days.

(21) Appl. No.: 12/450,612

(22) PCT Filed: Apr. 7, 2008

(86) PCT No.: PCT/JP2008/057222
§ 371 (c)(1),
(2), (4) Date: Oct. 2, 2009

(87) PCT Pub. No.: WO2008/126927
PCT Pub. Date: Oct. 23, 2008

(65) Prior Publication Data
US 2010/0281853 A1    Nov. 11, 2010

(30) Foreign Application Priority Data
Apr. 5, 2007  (JP) ................................ 2007-099688

(51) Int. Cl.
*F01N 3/00* (2006.01)
*F01N 3/10* (2006.01)

(52) U.S. Cl. ............................... 60/286; 60/276; 60/299
(58) Field of Classification Search ..................... 60/286
See application file for complete search history.

(56) References Cited

U.S. PATENT DOCUMENTS

| | | | |
|---|---|---|---|
| 6,182,443 B1 | 2/2001 | Jarvis et al. | |
| 2005/0056004 A1* | 3/2005 | Kakwani et al. | 60/286 |
| 2006/0213187 A1* | 9/2006 | Kupe et al. | 60/286 |
| 2008/0038174 A1 | 2/2008 | Mori et al. | |

FOREIGN PATENT DOCUMENTS

| | | |
|---|---|---|
| JP | A-04-210208 | 7/1992 |
| JP | A-10-015355 | 1/1998 |
| JP | A-2000-230414 | 8/2000 |
| JP | A-2004-211676 | 7/2004 |
| JP | 2006324778 A * | 11/2006 |
| WO | WO 2005/082494 A1 | 9/2005 |

* cited by examiner

*Primary Examiner* — Thomas Denion
*Assistant Examiner* — Jason Shanske
(74) *Attorney, Agent, or Firm* — Oliff & Berridge, PLC

(57) ABSTRACT

An object of the invention is to estimate the quantity of $N_2O$ produced in an ammonia oxidation catalyst in a case where the ammonia oxidation catalyst is provided in an exhaust passage of an internal combustion engine. In a case where an ammonia oxidation catalyst having the function of oxidizing ammonia is provided in an exhaust passage of an internal combustion engine, the quantity of $N_2O$ produced in the ammonia oxidation catalyst is estimated based on the difference between a measurement value of an upstream NOx sensor provided in the exhaust passage upstream of the ammonia oxidation catalyst and a measurement value of a downstream NOx sensor provided in the exhaust passage downstream of the ammonia oxidation catalyst.

7 Claims, 4 Drawing Sheets

METHOD OF ESTIMATING QUANTITY OF $N_2O$ PRODUCED IN AMMONIA OXIDATION CATALYST AND EXHAUST GAS PURIFICATION SYSTEM FOR INTERNAL COMBUSTION ENGINE

This application is the national phase application under 35 U.S.C. §371 of PCT international application No. PCT/JP2008/057222 filed on 7 Apr. 2008, which claims priority to Japanese patent application No. 2007-099688 filed on 5 Apr. 2007, the contents of which are incorporated herein by reference.

TECHNICAL FIELD

The present invention relates to a method of estimating the quantity of $N_2O$ produced in an ammonia oxidation catalyst for estimating the quantity of $N_2O$ (dinitrogen monoxide) produced in an ammonia oxidation catalyst provided in an exhaust passage of an internal combustion engine, and to an exhaust gas purification system for an internal combustion engine.

BACKGROUND ART

An NOx selective reduction catalyst that selectively reduces NOx in the exhaust gas using ammonia as a reducing agent is provided in an exhaust passage of the internal combustion engine in some cases. In such cases, urea is supplied to the NOx selective reduction catalyst by urea supply means. Urea supplied to the NOx selective reduction catalyst is once adsorbed by the NOx selective reduction catalyst, and the adsorbed urea is hydrolyzed to produce ammonia. The ammonia serves as a reducing agent to reduce NOx in the exhaust gas.

In this case, ammonia that has not been consumed in reduction of NOx may be discharged from the NOx selective reduction catalyst. In view of this, an ammonia oxidation catalyst having the function of oxidizing ammonia is provided in the exhaust passage downstream of the NOx selective reduction catalyst in some cases.

In such cases, if ammonia is oxidized in the ammonia oxidation catalyst in a state in which the temperature of the ammonia oxidation catalyst is sufficiently high, NOx is produced. On the other hand, if ammonia is oxidized in the ammonia oxidation catalyst in a state in which the temperature of the ammonia catalyst is relatively low, $N_2O$ may be produced. If this is the case, the quantity of ammonia and NOx discharged downstream of the ammonia oxidation catalyst decreases, and $N_2O$ is discharged. However, since $N_2O$ is a gas that contributes to a green house effect, it is desirable that emission of $N_2O$ to the atmosphere be reduced.

Japanese Patent Application Laid-Open No. 2000-230414 discloses an arrangement in which an NOx adsorbent and an NOx selective reduction catalyst are provided in series in order from the upstream in an exhaust passage of an internal combustion engine. In the arrangement disclosed in Japanese Patent Application Laid-Open No. 2000-230414, NOx having slipped through the NOx adsorbent is reduced in the NOx selective reduction catalyst into $N_2$ or $N_2O$.

DISCLOSURE OF THE INVENTION

An object of the present invention is to provide a technology that enables, in a case where an ammonia oxidation catalyst is provided in an exhaust passage of an internal combustion engine, estimation of the quantity of $N_2O$ produced in the ammonia oxidation catalyst.

According to the present invention, the quantity of $N_2O$ produced in an ammonia oxidation catalyst is estimated based on the difference between a measurement value of an upstream NOx sensor provided in an exhaust passage upstream of the ammonia oxidation catalyst and a downstream NOx sensor provided in the exhaust passage downstream of the ammonia oxidation catalyst.

More specifically, in a method of estimating the quantity of $N_2O$ produced in an ammonia oxidation catalyst in a case where an ammonia oxidation catalyst having the function of oxidizing ammonia is provided in an exhaust passage of an internal combustion engine, the method according to the present invention is characterized in that the quantity of $N_2O$ produced in said ammonia oxidation catalyst is estimated based on a difference between a measurement value of an upstream NOx sensor that is provided in said exhaust passage upstream of said ammonia oxidation catalyst and measures the NOx concentration in exhaust gas and a measurement value of a downstream NOx sensor that is provided in said exhaust passage downstream of said ammonia oxidation catalyst and measures the NOx concentration in exhaust gas.

When ammonia contained in the exhaust gas is supplied to an NOx sensor, the ammonia is oxidized in the NOx sensor, whereby NOx is produced. The NOx sensor measures the NOx concentration in the exhaust gas containing the NOx thus produced. Therefore, the measurement value of the NOx sensor is a value indicative of the proportion of the sum of the quantity of NOx and the quantity of ammonia in the exhaust gas.

In cases where NOx is produced in the ammonia oxidation catalyst by oxidation of ammonia in the exhaust gas, the ratio of the quantity of NOx and the quantity of ammonia in the exhaust gas changes between the upstream side and the downstream side of the ammonia oxidation catalyst, but the sum of them does not change. In consequence, the measurement value of the upstream NOx sensor and the measurement value of the downstream NOx sensor have substantially the same value.

On the other hand, in cases where $N_2O$ is produced in the ammonia oxidation catalyst by oxidation of ammonia in the exhaust gas, the sum of the quantity of NOx and the quantity of ammonia in the exhaust gas on the downstream side of the ammonia oxidation catalyst becomes smaller than that on the upstream side of the ammonia oxidation catalyst by a quantity corresponding to the quantity of produced $N_2O$. $N_2O$ is not sensed by the NOx sensor. In consequence, in this case, the measurement value of the downstream NOx sensor becomes smaller than the measurement value of the upstream NOx sensor. In addition, the larger that quantity of $N_2O$ produced in the ammonia oxidation catalyst is, the larger that difference between the measurement value of the upstream NOx sensor and the measurement value of the downstream NOx sensor becomes.

Therefore, the quantity of $N_2O$ produced in the ammonia oxidation catalyst can be estimated based on the difference between the measurement value of the upstream NOx sensor and the measurement value of the downstream NOx sensor.

The method of estimating the quantity of $N_2O$ produced in an ammonia oxidation catalyst according to the present invention may be applied to an exhaust gas purification system for an internal combustion engine having an ammonia oxidation catalyst provided in an exhaust passage of an internal combustion engine, an upstream NOx sensor provided in the exhaust passage upstream of the ammonia oxidation catalyst, a downstream NOx sensor provided in the exhaust passage downstream of the ammonia oxidation catalyst, an NOx selective reduction catalyst that is provided in the exhaust passage upstream of the upstream NOx sensor and selectively reduces NOx in the exhaust gas using ammonia as a reducing agent, and urea supply unit for supplying urea to the NOx selective reduction catalyst.

In the exhaust gas purification system for an internal combustion engine as described above, ammonia discharged from the NOx selective reduction catalyst without being consumed in reduction of NOx in the NOx selective reduction catalyst flows into the ammonia oxidation catalyst. In this case, the quantity of $N_2O$ produced by oxidation of ammonia having flown into the ammonia oxidation catalyst can be estimated, as per the above.

In the exhaust gas purification system for an internal combustion engine as described above, when the estimated quantity of $N_2O$ produced in the ammonia oxidation catalyst is equal to or larger than a specific quantity, the larger the quantity of produced $N_2O$ is, the more the quantity of urea supplied to the NOx selective reduction catalyst by said urea supply unit may be decreased.

Here, the specific quantity may be a threshold value that allows a determination that the quantity of $N_2O$ emitted to the atmosphere will be unduly large if the quantity of produced $N_2O$ is equal to or larger than said specific quantity.

By decreasing the quantity of urea supplied to the NOx selective reduction catalyst by the urea supply unit, the quantity of ammonia discharged from the NOx selective reduction catalyst can be decreased. In consequence, the quantity of $N_2O$ produced in the ammonia oxidation catalyst can be decreased. Therefore, emission of $N_2O$ to the atmosphere can be reduced.

The exhaust gas purification system for an internal combustion engine as described above may further be provided with temperature raising unit for raising the temperature of the ammonia oxidation catalyst when the estimated quantity of $N_2O$ produced in the ammonia oxidation catalyst is equal to or larger than a specific quantity.

Here, the specific quantity may be a threshold value that allows a determination that the quantity of $N_2O$ emitted to the atmosphere will be unduly large if the quantity of produced $N_2O$ is equal to or larger than said specific quantity, as with the aforementioned case.

A rise in the temperature of the ammonia oxidation catalyst facilitates production of NOx in oxidation of ammonia in the ammonia oxidation catalyst. Therefore, the quantity of $N_2O$ produced in the ammonia oxidation catalyst can be reduced by raising the temperature of the ammonia oxidation catalyst by the temperature raising unit. Thus, emission of $N_2O$ to the atmosphere can be reduced.

THE BEST MODE FOR CARRYING OUT THE INVENTION

In the following, specific embodiments of the $N_2O$ quantity estimation apparatus and the exhaust gas purification system for an internal combustion engine according to the present invention will be described with reference to the drawings.

Embodiment 1

(General Configuration of Internal Combustion Engine and its Air-Intake and Exhaust System)

Figure 1:
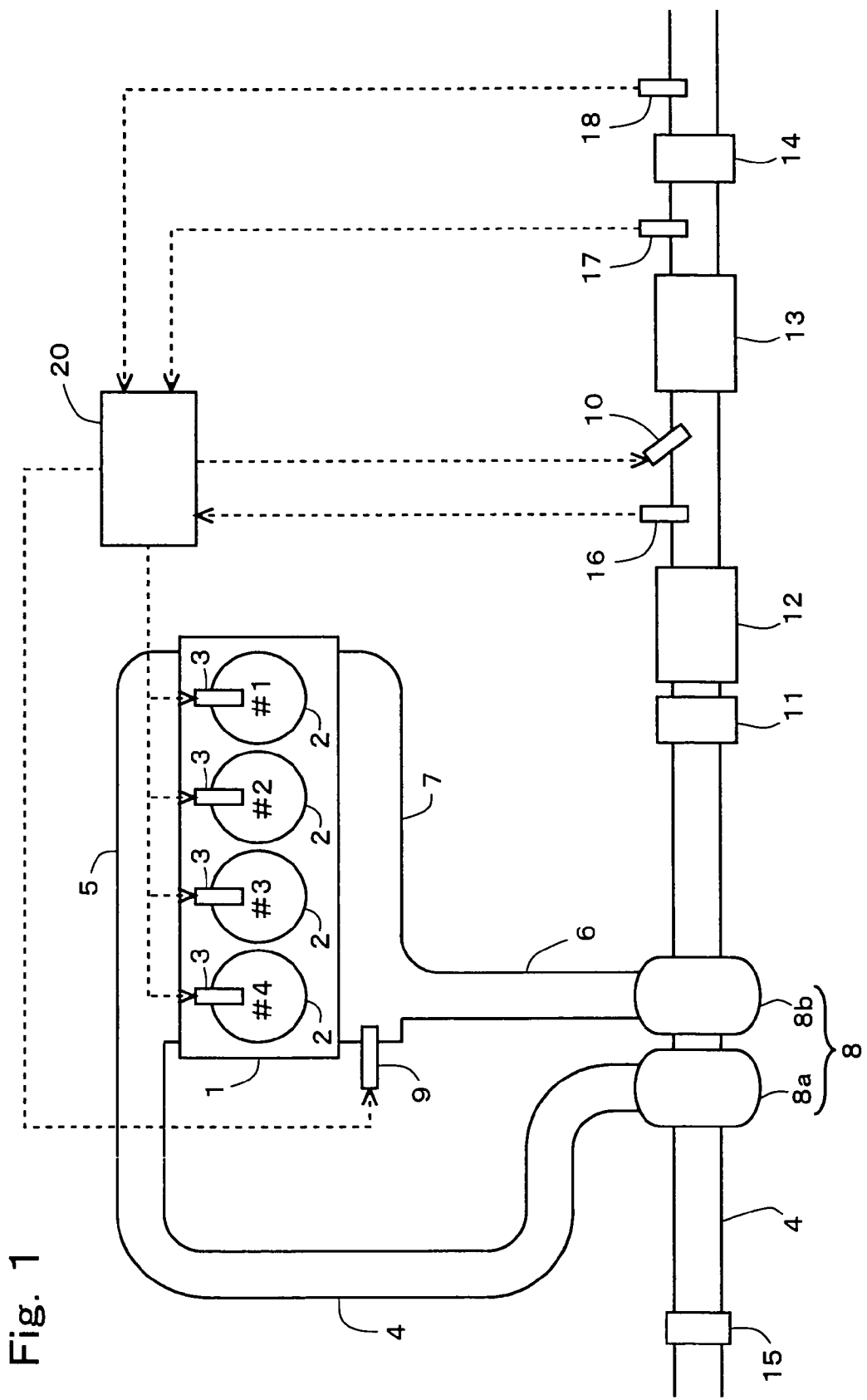
FIG. 1 is a diagram showing the general configuration of an internal combustion engine and its air-intake and exhaust system according to embodiment 1.

FIG. 1 is a diagram showing the general configuration of an internal combustion engine and its air-intake and exhaust system according to this embodiment. The internal combustion engine 1 is a diesel engine having four cylinders 2 for driving a vehicle. Each cylinder 2 is equipped with a fuel injection valve 3 that injects fuel directly into the cylinder 2.

The internal combustion engine 1 is connected with an intake manifold 5 and an exhaust manifold 7. To the intake manifold 5 is connected one end of an intake passage 4. To the exhaust manifold 7 is connected one end of an exhaust passage 6. In this embodiment, the exhaust passage 6 is connected to the exhaust manifold 7 at a position near No. 4 cylinder.

A compressor housing 8a of a turbocharger 8 is provided in the intake passage 4. A turbine housing 8b of the turbocharger 8 is provided in the exhaust passage 6. An air flow meter 15 is provided in the intake passage 4 upstream of the compressor housing 8a.

The exhaust manifold 7 is provided with a fuel addition valve 9 that adds fuel to the exhaust gas. An oxidation catalyst 11, a filter 12, an NOx selective reduction catalyst 13, and an ammonia oxidation catalyst 14, which are arranged in series in order from the upstream, are provided in the exhaust passage 6 downstream of the turbine housing 8b. The NOx selective reduction catalyst 13 is a catalyst that selectively reduces NOx in the exhaust gas using ammonia as a reducing agent. A catalyst having an oxidizing function, such as an oxidation catalyst, may be supported on the filter 12.

A temperature sensor 16 and a urea addition valve 10 are provided in the exhaust passage 6 between the filter 12 and the NOx selective reduction catalyst 13. The temperature sensor 16 is a sensor that senses the temperature of the exhaust gas. The urea addition valve 10 is a valve that adds urea solution to the exhaust gas. The urea addition valve 10 is supplied with urea solution from a urea solution tank (not shown) in which urea solution is stored. In this embodiment, the urea addition valve 10 corresponds to the urea supply unit according to the present invention.

Urea solution is added through the urea addition valve 10 at a time when the NOx selective reduction catalyst 13 is in an active state, whereby the urea solution is supplied to the NOx selective reduction catalyst 13. Urea in the urea solution supplied to the NOx selective reduction catalyst 13 is once adsorbed in the NOx selective reduction catalyst 13, and the adsorbed urea is hydrolyzed to produce ammonia. The ammonia serves as a reducing agent when NOx in the exhaust gas is reduced.

An upstream NOx sensor 17 is provided in the exhaust passage 6 downstream of the NOx selective reduction catalyst 13 and upstream of the ammonia oxidation catalyst 14. In addition, a downstream NOx sensor 18 is provided in the exhaust passage 6 downstream of the ammonia oxidation catalyst 14. The upstream and downstream NOx sensors 17, 18 are sensors that sense the NOx concentration in the exhaust gas.

To the internal combustion engine 1 is annexed an electronic control unit (ECU) 20. The ECU 20 is a unit that controls the operation state of the internal combustion engine 1. The ECU 20 is electrically connected with the air flow meter 15 and the temperature sensor 16. Output signals from them are input to the ECU 20.

The ECU 20 is also electrically connected with the fuel injection valve 3, the fuel addition valve 9, and the urea addition valve 10. They are controlled by the ECU 20.

(Method of Estimating Quantity of $N_2O$ Produced in Ammonia Oxidation Catalyst)

As described above, in this embodiment, urea solution is supplied to the NOx selective reduction catalyst 13, and urea is hydrolyzed in the NOx selective reduction catalyst 13 to produce ammonia. The portion of the ammonia thus produced that has not been consumed in reducing NOx is discharged from the NOx selective reduction catalyst 13 and flows into the ammonia oxidation catalyst 14.

Figure 2:
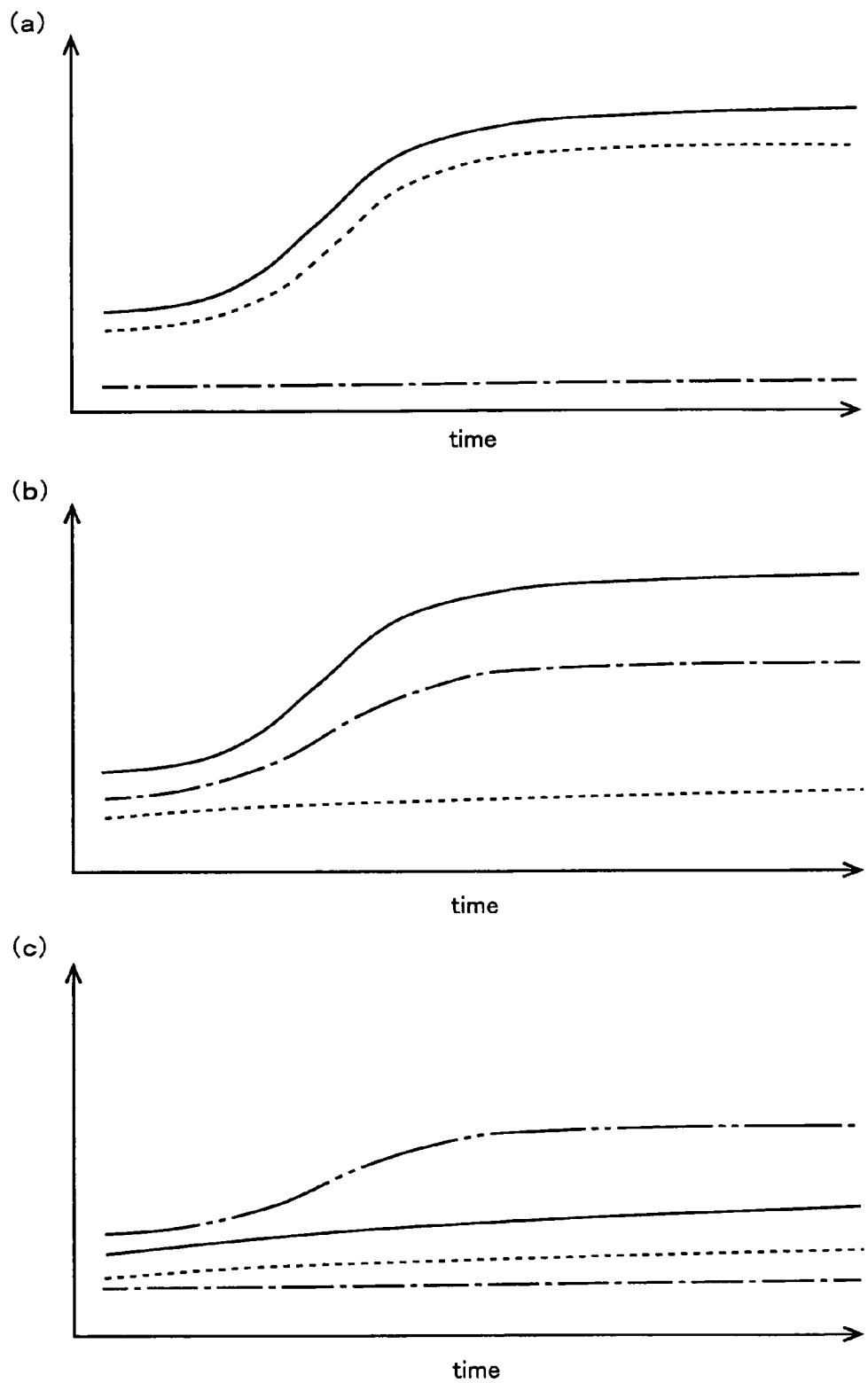
FIG. 2(a) is a graph showing changes in the quantity of ammonia and the quantity of NOx in the exhaust gas flowing into an ammonia oxidation catalyst, and the output value of an upstream NOx sensor.
FIG. 2(b) shows changes in the quantity of ammonia and the quantity of NOx in the exhaust gas flowing out of the ammonia oxidation catalyst, and the output value of a downstream NOx sensor in a case where $N_2O$ is not produced in the ammonia oxidation catalyst.
FIG. 2(c) shows changes in the quantity of ammonia, the quantity of NOx, and the quantity of $N_2O$ in the exhaust gas flowing out of the ammonia oxidation catalyst, and the output value of the downstream NOx sensor in a case where $N_2O$ is produced in the ammonia oxidation catalyst by oxidation of ammonia.

The ammonia flowing into the ammonia oxidation catalyst 14 is oxidized to turns into NOx or $N_2O$. Here, the method of estimating the quantity of $N_2O$ produced in the ammonia oxidation catalyst according to this embodiment will be described with reference to FIG. 2.

FIG. 2(a) shows changes in the quantity of ammonia and the quantity of NOx in the exhaust gas flowing into the ammonia oxidation catalyst 14, and the output value of the upstream NOx sensor 17. FIG. 2(b) shows changes in the quantity of ammonia and the quantity of NOx in the exhaust gas flowing out of the ammonia oxidation catalyst 14, and the output value of the downstream NOx sensor 18 in a case where $N_2O$ is not produced in the ammonia oxidation catalyst 14. FIG. 2(c) shows changes in the quantity of ammonia, the quantity of NOx, and the quantity of $N_2O$ in the exhaust gas flowing out of the ammonia oxidation catalyst 14, and the output value of the downstream NOx sensor 18 in a case where $N_2O$ is produced in the ammonia oxidation catalyst 14 by oxidation of ammonia. In FIGS. 2(a), 2(b), and 2(c), the broken line represents the quantity of ammonia in the exhaust gas, and the alternate long and short dashed line represents the quantity of NOx in the exhaust gas. In FIG. 2(a), the solid line represents the output value of the upstream NOx sensor 17. In FIGS. 2(b) and 2(c), the solid line represents the output value of the downstream NOx sensor 18. In FIG. 2(c), the chain double-dashed line represents the quantity of $N_2O$ in the exhaust gas.

When ammonia in the exhaust gas is supplied to the upstream NOx sensor 17 and the downstream NOx sensor 18, the ammonia is oxidized to produce NOx. The NOx sensors 17, 18 sense the NOx concentration in the exhaust gas containing NOx thus produced. Therefore, the measurement value of each of the NOx sensors 17, 18 is a value indicative of the proportion of the sum of the quantity of NOx and the quantity of ammonia in the exhaust gas.

In cases where $N_2O$ is not produced by oxidation of ammonia in the ammonia oxidation catalyst 14, namely, in cases where oxidized ammonia turns entirely into NOx, the ratio of the quantity of ammonia and the quantity of NOx in the exhaust gas changes between the upstream side and the downstream side of the ammonia oxidation catalyst 14, but the sum of them does not change. In consequence, the measurement value of the upstream NOx sensor 17 and the measurement value of the downstream NOx sensor 18 are substantially equal to each other as shown in FIGS. 2(a) and 2(b).

On the other hand, in cases where $N_2O$ is produced by oxidation of ammonia in the exhaust gas in the ammonia oxidation catalyst 14, the sum of the quantity of NOx and the quantity of ammonia in the exhaust gas on the downstream side of the ammonia oxidation catalyst 14 becomes smaller than that on the upstream side of the ammonia oxidation catalyst by a quantity corresponding to the quantity of produced $N_2O$. In consequence, as shown FIGS. 2(a) and 2(c), the measurement value of the downstream NOx sensor 18 becomes smaller than the measurement value of the upstream NOx sensor 17. In addition, the larger the quantity of $N_2O$ produced in the ammonia oxidation catalyst 14 is, the smaller the sum of the quantity of NOx and the quantity of ammonia in the exhaust gas on the downstream side of the ammonia oxidation catalyst 14 is. Consequently, the larger the quantity of $N_2O$ produced in the ammonia oxidation catalyst 14 is, the larger the difference between the measurement value of the upstream NOx sensor 17 and the measurement value of the downstream NOx sensor 18 becomes.

In view of the above, in this embodiment, the quantity of $N_2O$ produced in the ammonia oxidation catalyst 14 is estimated based on the difference between the measurement value of the upstream NOx sensor 17 and the measurement value of the downstream NOx sensor 18. Specifically, the measurement value of the downstream NOx sensor 18 is subtracted from the measurement value of the upstream NOx sensor 17 to calculate the difference between them, and the larger the difference is, the larger the quantity of $N_2O$ produced in the ammonia oxidation catalyst 14 is determined to be.

(Produced $N_2O$ Quantity Reduction Control)

NOx or $N_2O$ produced in the ammonia oxidation catalyst 14 is discharged from the ammonia oxidation catalyst 14 and emitted to the atmosphere. In this embodiment, in order to reduce emission of $N_2O$ to the atmosphere, a produced $N_2O$ quantity reduction control that reduces the quantity of $N_2O$ produced in the ammonia oxidation catalyst 14 is performed. Here, a routine of the produced $N_2O$ quantity reduction control according to this embodiment will be described with reference to the flow chart shown in FIG. 3. This routine is stored in the ECU 20 in advance and executed repeatedly at predetermined intervals during the operation of the internal combustion engine 1.

In this routine, first in step S101, the ECU 20 reads the measurement value Snox1 of the upstream NOx sensor 17.

Then, the ECU 20 proceeds to step S102, where it reads the measurement value Snox2 of the downstream NOx sensor 18.

Then, the ECU proceeds to step S103, where it calculates the quantity Qan of $N_2O$ produced in the ammonia oxidation catalyst 14 based on the value obtained by subtracting the measurement value Snox2 of the downstream NOx sensor 18 from the measurement value Snox1 of the upstream NOx sensor 17. In this process, the larger the value obtained by subtracting the measurement value Snox2 of the downstream NOx sensor 18 from the measurement value Snox1 of the upstream NOx sensor 17 is, the larger the quantity Qan of $N_2O$ produced in the ammonia oxidation catalyst 14 is determined to be by the ECU 20, as described before. The relationship between the value obtained by subtracting the measurement value Snox2 of the downstream NOx sensor 18 from the measurement value Snox1 of the upstream NOx sensor 17 and the quantity Qan of $N_2O$ produced in the ammonia oxidation catalyst 14 is obtained by, for example, experiments and stored in the ECU 20 in advance.

Then, the ECU 20 proceeds to step S104, where it makes a determination as to whether or not the quantity Qan of $N_2O$ produced in the ammonia oxidation catalyst 14 is equal to or larger than a specific quantity Qan0. Here, the specific quantity Qan0 is a threshold value that allows a determination that the quantity of $N_2O$ emitted to the atmosphere will be unduly large if the quantity Qan of produced $N_2O$ is equal to or larger than this specific quantity Qan0. If the determination in step S104 is affirmative, the ECU 20 proceeds to step S105, and if the determination is negative, the ECU 20 once terminates execution of this routine.

In step S105, the ECU 20 makes a downward adjustment of the quantity Qadd of urea solution added through the urea addition valve 10 based on the quantity Qan of $N_2O$ produced in the ammonia oxidation catalyst 14. Specifically, the larger the quantity Qan of $N_2O$ produced in the ammonia oxidation catalyst 14 is, the more the quantity Qadd of urea solution added through the urea addition valve 10 is decreased. Thereafter, the ECU 20 once terminates execution of this routine.

According to the above-described routine, in cases where the quantity Qan of $N_2O$ produced in the ammonia oxidation catalyst 14 is equal to or larger than the specific quantity Qan0, the larger the quantity Qan of $N_2O$ produced in the ammonia oxidation catalyst 14 is, the smaller the quantity of urea solution supplied to the NOx selective reduction catalyst is made. Thus, the quantity of ammonia discharged from the NOx selective reduction catalyst 13 can be decreased. In consequence, the quantity of $N_2O$ produced in the ammonia oxidation catalyst 14 can be decreased. Therefore, according to this embodiment, emission of $N_2O$ to the atmosphere can be reduced.

The largeness of the quantity Qan of $N_2O$ produced in the ammonia oxidation catalyst 14 implies that the quantity of ammonia discharged from the NOx selective reduction catalyst 13 without being consumed in reduction of NOx in the NOx selective reduction catalyst 13 is large. Furthermore, the largeness in the quantity of ammonia discharged from the NOx selective reduction catalyst 13 without being consumed in reduction of NOx implies that the quantity Qadd of urea solution added through the urea addition valve 10 is too large. Therefore, according to this embodiment, unnecessary addition of urea solution through the urea addition valve 10 can be prevented.

Embodiment 2

The general configuration of an internal combustion engine and its air-intake and exhaust system according to this embodiment is the same as that in embodiment 1. In this embodiment also, the quantity of $N_2O$ produced in the ammonia oxidation catalyst 14 is estimated in the manner same as that in embodiment 1.

(Produced $N_2O$ Quantity Reduction Control)

Figure 3:
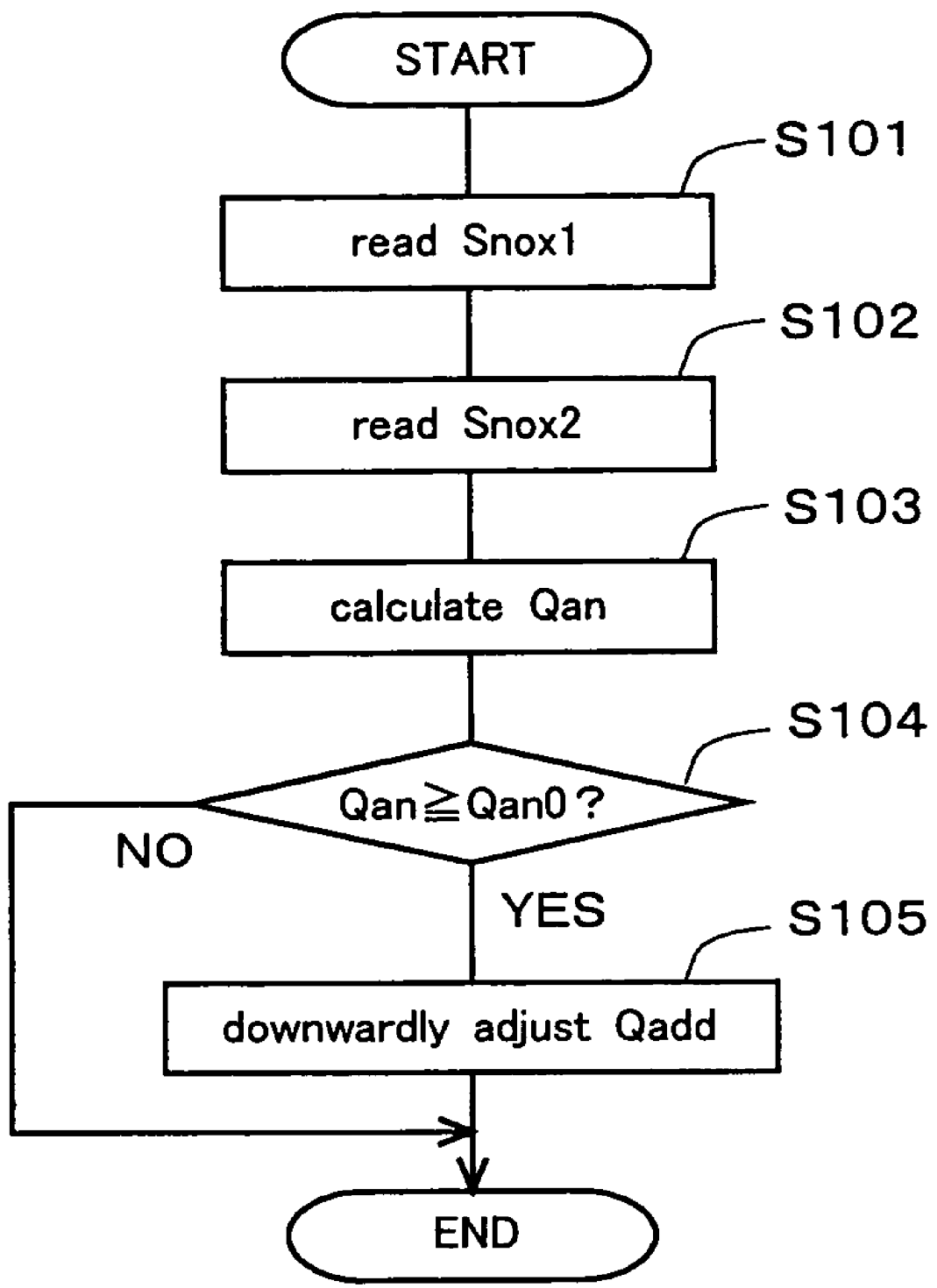
FIG. 3 is a flow chart of a routine of a produced $N_2O$ quantity reduction control according to embodiment 1.
Figure 4:
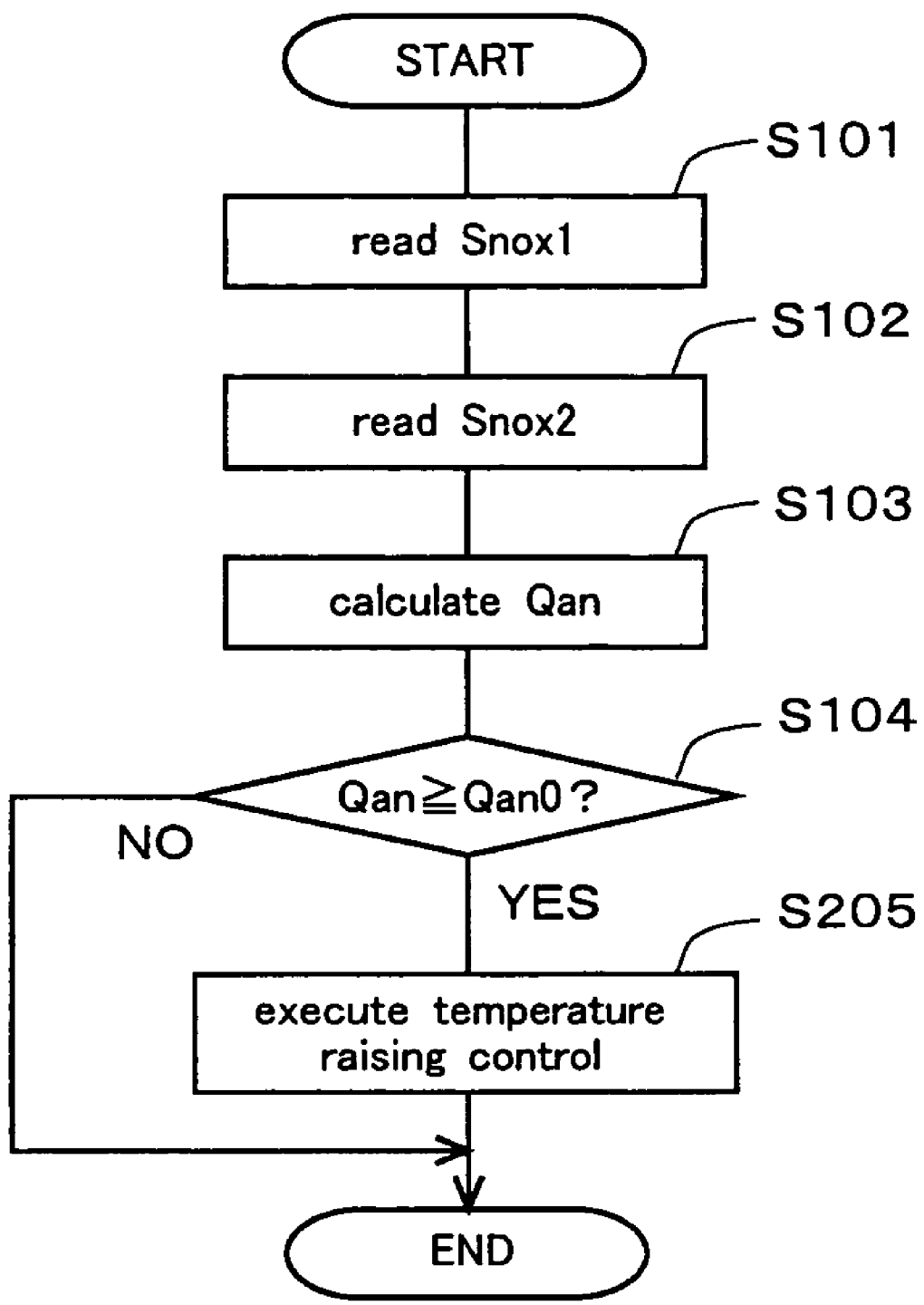
FIG. 4 is a flow chart of a routine of a produced $N_2O$ quantity reduction control according to embodiment 2.

Here, a routine of a produced $N_2O$ quantity reduction control according to this embodiment will be described with reference to the flow chart shown in FIG. 4. This routine is stored in the ECU 20 in advance and executed repeatedly at predetermined intervals during the operation of the internal combustion engine 1. In this routine, step S105 shown in FIG. 3 is replaced by step S20.5. Therefore, a description of steps S101 through S104 will be omitted.

In this routine, if the determination in step S104 is affirmative, the ECU 20 proceeds to step S205. In step S205, the ECU 20 executes a temperature raising control for raising the temperature of the ammonia oxidation catalyst 14. The temperature raising control is performed by adding fuel through the fuel addition valve 9 (or by increasing the quantity of fuel added through the fuel addition valve 9). Thereby, fuel added through the fuel addition valve 9 is oxidized in oxidation catalyst 11, and the temperature of the exhaust gas is raised by oxidation heat generated thereby. In consequence, the temperature of the ammonia oxidation catalyst 14 rises. This temperature raising control may be a control for raising the temperature of the exhaust gas discharged from the internal combustion engine 1 or a control for raising the temperature of the ammonia oxidation catalyst 14 by means of a heater or the like. In this embodiment, the ECU 20 that executes step S205 corresponds to the temperature raising means according to the present invention. After step S205, the ECU 20 once terminates execution of this routine.

According to the above-described routine, the temperature of the ammonia oxidation catalyst 14 is raised when the quantity Qan of $N_2O$ produced in the ammonia oxidation catalyst 14 is equal to or larger than the specific quantity Qan0. A rise in the temperature of the ammonia oxidation catalyst 14 facilitates production of NOx in oxidation of ammonia in the ammonia oxidation catalyst 14. Therefore, the quantity of $N_2O$ produced in the ammonia oxidation catalyst 14 can be reduced by raising the temperature of the ammonia oxidation catalyst 14 by the temperature raising control. Thus, according to this embodiment, emission of $N_2O$ to the atmosphere can be reduced.

The above-described embodiments may be applied in combination.

INDUSTRIAL APPLICABILITY

According to the present invention, in a case where an ammonia oxidation catalyst is provided in an exhaust passage of an internal combustion engine, the quantity of $N_2O$ produced in the ammonia oxidation catalyst can be estimated.

The invention claimed is:

1. A method of estimating the quantity of $N_2O$ produced in an ammonia oxidation catalyst where an ammonia oxidation catalyst having a function of oxidizing ammonia is provided in an exhaust passage of an internal combustion engine, wherein the quantity of $N_2O$ produced in said ammonia oxidation catalyst is estimated based on a difference between a measurement value of an upstream NOx sensor that is provided in said exhaust passage upstream of said ammonia oxidation catalyst and measures the NOx concentration in exhaust gas, and a measurement value of a downstream NOx sensor that is provided in said exhaust passage downstream of said ammonia oxidation catalyst and measures the NOx concentration in exhaust gas.

2. The method of estimating the quantity of $N_2O$ produced in an ammonia oxidation catalyst according to claim 1, wherein the larger the value obtained by subtracting the measurement value of said downstream NOx sensor from the measurement value of said upstream NOx sensor is, the larger the quantity of $N_2O$ produced in said ammonia oxidation catalyst is estimated to be.

3. An exhaust gas purification system for an internal combustion engine comprising:
    an ammonia oxidation catalyst provided in an exhaust passage of an internal combustion engine and having a function of oxidizing ammonia;
    an upstream NOx sensor that is provided in said exhaust passage upstream of said ammonia oxidation catalyst and measures the NOx concentration in exhaust gas;
    a downstream NOx sensor that is provided in said exhaust passage downstream of said ammonia oxidation catalyst and measures the NOx concentration in exhaust gas;

an NOx selective reduction catalyst that is provided in said exhaust passage upstream of said upstream NOx sensor and selectively reduces NOx in exhaust gas using ammonia as a reducing agent;

an urea addition valve for supplying urea to said NOx selective reduction catalyst; and an electronic control unit containing operative logic, which when executed, estimates the quantity of $N_2O$ produced in said ammonia oxidation catalyst by the method of estimating the quantity of $N_2O$ produced in an ammonia oxidation catalyst according to claim 1.

4. The exhaust gas purification system for an internal combustion engine according to claim 3, wherein when the quantity of produced $N_2O$ estimated by the method of estimating the quantity of $N_2O$ produced in the ammonia oxidation catalyst is equal to or larger than a specific quantity, the larger the quantity of produced $N_2O$ is, and the more the quantity of urea supplied to said NOx selective reduction catalyst by said urea supply means is decreased.

5. The exhaust gas purification system for an internal combustion engine according to claim 3, wherein the electronic control unit raises the temperature of said ammonia oxidation catalyst when the quantity of produced $N_2O$ estimated by the method of estimating the quantity of $N_2O$ produced in the ammonia oxidation catalyst is equal to or larger than a specific quantity.

6. The exhaust gas purification system for an internal combustion engine according to claim 4, wherein said specific quantity is a threshold value that allows a determination that the quantity of $N_2O$ emitted to the atmosphere will be unduly large if the quantity of produced $N_2O$ is equal to or larger than said specific quantity.

7. The exhaust gas purification system for an internal combustion engine according to claim 5, wherein said specific quantity is a threshold value that allows a determination that the quantity of $N_2O$ emitted to the atmosphere will be unduly large if the quantity of produced $N_2O$ is equal to or larger than said specific quantity.

\* \* \* \* \*